June 12, 1934.  J. J. KANE  1,962,350

MEANS OF WELDING PIPE

Filed July 6, 1931

JOSEPH J. KANE
INVENTOR

BY Jesse R Stone
Lester B. Clark
ATTORNEYS

Patented June 12, 1934

1,962,350

UNITED STATES PATENT OFFICE 1,962,350

MEANS OF WELDING PIPE

Joseph J. Kane, Galveston, Tex.

Application July 6, 1931, Serial No. 548,797

10 Claims. (Cl. 219—10)

The invention relates to an improvement in the means and method of welding the ends of pipe sections which are being assembled to form a pipe line.

In the present day methods of assembling pipe lines it is usual to weld the ends of the pipe sections together in order to form the line. Various expedients have been resorted to in an attempt to form a simple and economical weld between the pipe ends. Some operators use the acetylene welding whereas others employ electric welding. Electric welding is the most economical but in order to obtain a satisfactory weld having sufficient tensile strength, ductility, density and at the same time to form the weld in an economical manner, the usual practice is to slightly bell the ends of the pipe sections and then insert what is known as a steel chill ring. This chill ring is positioned underneath the ends of the pipe sections which have been belled and the ends of the sections are spaced slightly apart so that a bond may be made by the welding material with the chill ring in order to insure a proper weld. The disadvantages of this type of weld are many, the most prominent being the increased cost of forming the bells on the pipe, the uneven surface caused on the inside of the pipe by the bell portions and by the chill ring and the fact that a great quantity of material must be melted during the welding operation in order to fill the large groove occasioned by separating the ends of the pipe a sufficient distance to expose the chill ring, as well as the formation of a pocket in which corrosive substances may collect and attack the pipe.

One of the objects of the invention is to assemble a pipe line having welded joints wherein the interior surface of the joint is flush with the pipe surface and smooth to reduce frictional losses.

One of the objects of the invention is to provide a chill ring for use in pipe welding, which ring is formed of combustible material.

Another object of the invention is to provide a chill ring adapted to be positioned beneath the area to be welded, which chill ring is of combustible material and is adapted to be ignited by the heat of the welding operation.

Still another object of the invention is to weld pipe joints by the method of supporting the area to be welded by a chill ring which will be ignited and consumed so that it is thereby removed as an obstruction in the pipe.

A still further object of the invention is to provide a chill ring having an area in contact with the portion of the pipe to be welded and also having a supporting area for the first area so that when the first area is consumed the second area will remain as a supporting structure before it is consumed by the combustion initiated during the welding operation.

Other and further objects of the invention will be readily apparent when the following description is considered in connection with the accompanying drawing wherein Fig. 1 is a central vertical section of two pipe sections which are being welded together in accordance with the means and method of this invention.

The method of welding and plain type of backing ring are claimed in my copending application Serial No. 604,468, filed April 11, 1932, for a Means and method of welding pipe.

In constructing pipe lines it is usual to distribute the pipe sections along the right of way in such a manner that they will be convenient for placement upon the line when the pipe is to be joined. By having reference to Fig. 1 a pipe section 2 is illustrated, which pipe section has already been welded to the pipe line and the end 3 thereof is being connected to the end 4 of the pipe section 5, which is the next section to be added to the pipe line; or, the joint being welded may be any two pipe sections which are to be connected together by welding.

Figure 1:
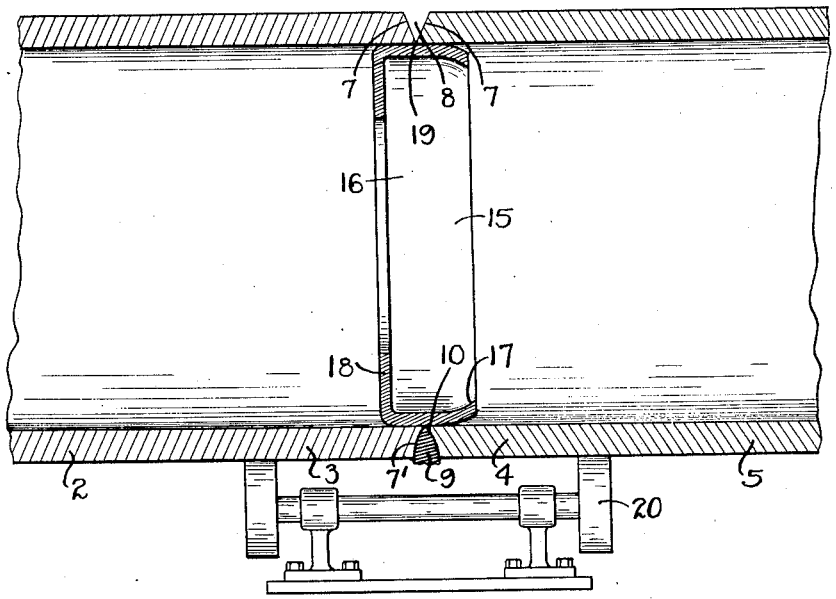

The ends of the pipe are formed with a steep bevel indicated at 7. The two bevels 7 together form the groove 8, which is to receive the welded material 9 as best seen in Fig. 1. As originally formed the surfaces 7 are straight and inclined, but when the welding operation is performed the material on the surface 7 is melted by the heat of the electric arc so that this surface is slightly concave as seen at 7' on the body portion of the pipe in Fig. 1. In this manner the material melted away from the surface 7 will flow into the apex 10 of the groove 8 and then the remainder of the groove 8 will be filled with the welding material 9 until the two pipe ends assume substantially the configuration shown on the bottom side of Fig. 1.

In event a weld of the type shown is to be made by use of electricity it has been found necessary to support or reenforce the area on the inside of the pipe adjacent the ends of the pipe sections where the weld is to be made. As previously stated, various types of chill rings have been provided which are welded to the pipe sections to form a permanent part of the pipe line. The present invention, however, seeks to avoid the provision of a chill ring of a permanent type and as distinguished from this a temporary chill ring 15 is provided.

The chill ring 15 may be formed of any suitable type of combustible material. As an example of a material which has been found satisfactory, highly compressed paper is mentioned. This paper may be compressed so that the gases formed on combustion will not cause the formation of blow holes in the weld. Materials of this sort are well known and in the future development of the invention other forms of material may be adapted. The essential requirements of such a material should be that it will resist the heat of the welding operation for a sufficient period to enable the welder to complete his operation so as to form a flush weld on interior of pipe to be ignited by the heat of making the weld, and to then slowly burn so that after a period of a few minutes the ring will be entirely consumed leaving only an ash or slight residue in the pipe. One reason that no pin or blow holes occur in the weld when the present invention is employed is because the gases given off by the combustion or charring of the backing tend to combine with the oxygen present and prevent oxidation at the base of the weld.

The advantage of this type of ring is that it need not be removed by a special operation after the weld has been completed and neither will it remain in the pipe to form an obstruction to the passage of fluid through the pipe, and furthermore, it will be positioned beneath the area during the welding operation so that a smooth inside surface of the pipe joint will be assured.

Fig. 1 shows the form of such ring which may be formed of any suitable pressed, moulded or stamped material and may include the weld positioning area 16 which is shown as cylindrical in form and is arranged for engagement with the pipe ends directly inside of the groove 8 where the welded material is to be placed. This body or weld positioning portion 16 is tapered slightly as at 17 in order to allow its insertion into the end of the pipe to receive the pipes when they are being placed on the line. Joined to, as seen in Fig. 1 formed integral with the portion 16, may be the flange or reenforcing or supporting part of the ring 18. This flange is shown as extended in a radial direction and being positioned away from the area to be welded. When this type of the ring is employed the portion 19 would first be ignited by the heat of the weld, it being understood that the pipes 2 and 5 are rotated on a cradle or dolly 20 during the welding operation. Thus the weld is started at the uppermost part of the pipe connection and the pipe is rotated as the weld proceeds until the weld is completed around the periphery of the pipe.

Obviously the ring 15 will be ignited by the heat of the welding operation and it will be formed of such material and of such density that the combustion will proceed slowly and at such a rate that the flange 18 will not be consumed until after sufficient period has elapsed to enable the welder to complete that operation. Thus, the body portion 15 may be consumed as the weld proceeds along the pipe but the flange 18 being spaced away from the heated surface will not be consumed but will remain intact to insure proper support for the part of the weld positioning or body of the ring. In this manner the entire ring will not collapse, due to the burning, until after such time as the weld has been completed.

The provision of a ring of this type prevents the molten material from entering the interior of the pipe and the ring will be of such density that it will resist the heat of the welding for a period long enough to allow the material in the apex 10 of the groove to solidify before the ring is consumed. It is, therefore, apparent that a smooth inside surface will be provided and the ring 15 which has insured this smooth surface will be entirely consumed except for a small amount of ash or residue which will be left in the pipe. It is usual to blow out pipe lines before they are put into actual operation or to run a "go devil" or scraper through the pipe in order to determine that the pipe is clear of obstruction. Any ash or small particles of the ring which remain inside of the pipe would be removed by either one of these operations so that a very satisfactory and highly efficient inside surface will be obtained.

Figure 3:
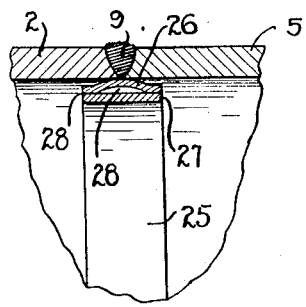
Fig. 3 is a broken detail sectional view of a modified form of the invention.

Fig. 3 shows a modified form of the ring which is indicated at 25. This ring operates in the manner similar to the ring of Fig. 1 but is formed in a slightly different manner, being composed of the outer weld positioning ring 26 and the inner supporting ring 27. These rings may be attached together as at 28 with the outer ring 26 of a smooth curved configuration so that it will be spaced away from the inner ring 27 to form an air space 28 which serves to insulate the inner ring 27 and in this manner insure that the portion of the outer ring 26 beneath the unwelded area of the pipe will remain in proper position until the welding is completed. It is to be understood that the inner ring 27 may be curved and the outer ring 26 made flat to engage the pipe if desired.

In this Fig. 3 modification the inner ring 27 might be formed of material of a different density or different combustion than the outer ring, which combustion would be less combustible than the outer ring to insure that the inner ring would remain as a support until the weld is completed.

Figure 2:
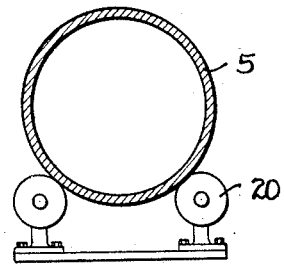
Fig. 2 is a cross section of the pipe being welded and showing the manner of mounting the pipe for the welding operation.

Fig. 2 shows a sectional view of how the pipe is mounted on the dolly 20 for rotation in order that the welding operation may be conducted on the high side of the pipe.

While two forms of the invention have been shown, it is to be understood that the ring may take on various configurations and that any method of welding may be employed, the principal novelty in the invention residing in the means and method of providing a smooth interior surface on the pipe and eliminating the re-enforcing ring which has been used heretofore to obtain this smooth surface.

Having described the invention what I claim is:

1. A ring for use in welding pipe ends including a body portion adapted to engage the pipe ends to be welded, and a flange connected to said body and extending radially inward to reenforce said body and retain the same in engagement with the pipe, both of said portions being composed of combustible material and removed as an obstruction within the pipe by burning to an ash.

2. A ring for use in welding pipe ends including a body portion adapted to engage the pipe ends to be welded, and a flange connected to said body and extending radially inward to reenforce said body and retain the same in engagement with the pipe, said ring being formed of combustible material.

3. A ring for use in welding pipe ends including a body portion adapted to engage the pipe ends to be welded, and a flange connected to said body and extending radially inward to reenforce said body and retain the same in engagement with the pipe, said ring being formed of combustible material and adapted to be ignited by the heat of the welding operation.

4. A combustible pipe positioning ring for welding operations including a body formed of combustible material and having a smooth circumferential portion to be positioned beneath the pipe portions to be welded, and a supporting flange area for said body.

5. A combustible pipe weld positioning ring including a radial flange portion, a circumferential weld positioning portion formed integral with said flange, said weld positioning portion being arranged to be ignited during the welding operation whereby said ring may be consumed by combustion.

6. A ring for positioning inside the abutting ends of pipe to be welded including a portion of combustible material to underlie the groove to be welded, and a portion of combustible material to support said first portion.

7. A ring for positioning inside the abutting ends of pipe to be welded including a portion to underlie the groove to be welded, and a portion to support said first portion, said ring being made of combustible material whereby it will be ignited during the welding operation and thus be removed as an obstruction in the pipe.

8. A combustible ring for pipe welding, including a portion to abut against the inside of the area to be welded so that a smooth inside surface will be formed, and a portion to support said first portion and disposed out of engagement with the pipe.

9. A combustible ring for pipe welding, including a portion to abut against the inside of the area to be welded so that a smooth inside surface will be formed, a portion to support said first portion and disposed out of engagement with the pipe, said ring being made of pressed paper.

10. A combustible ring for pipe welding, including a portion to abut against the inside of the area to be welded so that a smooth inside surface will be formed, a portion to support said first portion and disposed out of engagement with the pipe, said ring being adapted for ignition during the welding operation by the heat of the weld whereby said first portion will be consumed before said last portion.

JOSEPH J. KANE.